(12) United States Patent
Tsirline et al.

(10) Patent No.: US 8,358,246 B2
(45) Date of Patent: Jan. 22, 2013

(54) RFID UHF STRIPLINE ANTENNA-COUPLER

(75) Inventors: Boris Y. Tsirline, Glenview, IL (US); Karl Torchalski, Arlington Heights, IL (US); Martin Andreas Karl Schwan, Chicago, IL (US)

(73) Assignee: ZIH Corp., Lincolnshire, IL (US)

(*) Notice: Subject to any disclaimer, the term of this patent is extended or adjusted under 35 U.S.C. 154(b) by 1088 days.

(21) Appl. No.: 11/829,455

(22) Filed: Jul. 27, 2007

(65) Prior Publication Data

US 2007/0262873 A1 Nov. 15, 2007

Related U.S. Application Data

(63) Continuation-in-part of application No. 11/371,785, filed on Mar. 9, 2006, now Pat. No. 7,586,410.

(51) Int. Cl.
*H01Q 1/38* (2006.01)
*G08B 13/14* (2006.01)

(52) U.S. Cl. ............... 343/700 MS; 340/572.7

(58) Field of Classification Search ........... 343/700 MS, 343/778, 795; 340/572.1, 572.7, 572.8, 10.1; 455/41.1
See application file for complete search history.

(56) References Cited

U.S. PATENT DOCUMENTS

| | | | |
|---|---|---|---|
| 2,812,501 A | 11/1957 | Sommers | |
| 3,665,480 A * | 5/1972 | Fassett | 343/754 |
| 4,131,894 A * | 12/1978 | Schiavone | 343/700 MS |
| 4,208,660 A * | 6/1980 | McOwen, Jr. | 343/769 |
| 4,486,758 A * | 12/1984 | de Ronde | 343/700 MS |
| 4,614,947 A * | 9/1986 | Rammos | 343/778 |
| 4,644,362 A * | 2/1987 | Rammos | 343/778 |
| 4,819,004 A * | 4/1989 | Argintaru et al. | 343/778 |
| 5,192,954 A | 3/1993 | Brockelsby et al. | |
| 5,317,646 A | 5/1994 | Sang, Jr. et al. | |
| 5,499,033 A * | 3/1996 | Smith | 343/700 MS |
| 5,652,711 A | 7/1997 | Vennekens | |
| 5,983,243 A | 11/1999 | Heiney et al. | |
| 6,012,083 A | 1/2000 | Savitzky et al. | |

(Continued)

FOREIGN PATENT DOCUMENTS

EP 1 394 719 A1 3/2004

(Continued)

OTHER PUBLICATIONS

Office Action issued May 16, 2008 in U.S. Appl. No. 11/371,785.

(Continued)

*Primary Examiner* — Michael C Wimer
(74) *Attorney, Agent, or Firm* — Alston & Bird LLP (57) ABSTRACT

A stripline antenna-coupler for a RFID system is provided. The coupler is configured to communicate with a targeted transponder from among a group of multiple adjacent transponders. The coupler may include at least two conductive strips, at least one terminating load, a dielectric material, a first ground plane, and a second ground plane. Each of the conductive strips extends between the first and second ground planes and the dielectric material from an input end connected to a transceiver to a loaded end connected to the terminating load. The conductive strips may be configured to propagate electromagnetic fields concentrated in a near field region of the conductive strips in a direction generally perpendicular to the conductive strips to couple with a targeted transponder. The coupler may include an enclosure for directing the electromagnetic fields. The conductive strip may have a tapered or non-linear profile such as a modified bow-tie profile.

21 Claims, 5 Drawing Sheets

U.S. PATENT DOCUMENTS

| | | | |
|---|---|---|---|
| 6,091,373 A * | 7/2000 | Raguenet | 343/778 |
| 6,177,872 B1 | 1/2001 | Kodukula et al. | |
| 6,239,764 B1 * | 5/2001 | Timofeev et al. | 343/795 |
| 6,246,326 B1 | 6/2001 | Wiklof et al. | |
| 6,421,018 B1 * | 7/2002 | Zeilinger et al. | 343/713 |
| 6,624,718 B2 | 9/2003 | Mauritz et al. | |
| 6,802,659 B2 | 10/2004 | Cremon et al. | |
| 6,848,616 B2 | 2/2005 | Tsirline et al. | |
| 6,899,476 B1 | 5/2005 | Barrus et al. | |
| 7,037,009 B2 | 5/2006 | Barrus et al. | |
| 7,142,815 B2 | 11/2006 | Desjeux et al. | |
| 7,190,270 B2 | 3/2007 | Brown et al. | |
| 7,342,499 B2 | 3/2008 | Chiu et al. | |
| 7,375,633 B2 | 5/2008 | Shanton | |
| 7,398,054 B2 | 7/2008 | Tsirline et al. | |
| 7,425,887 B2 | 9/2008 | Tsirline et al. | |
| 7,468,670 B2 * | 12/2008 | Liu et al. | 340/572.1 |
| 7,586,410 B2 * | 9/2009 | Tsirline et al. | 340/572.1 |
| 2001/0029857 A1 | 10/2001 | Heredia et al. | |
| 2003/0063001 A1 | 4/2003 | Hohberger et al. | |
| 2005/0045723 A1 | 3/2005 | Tsirline et al. | |
| 2005/0045724 A1 | 3/2005 | Tsirline et al. | |
| 2005/0206524 A1 | 9/2005 | Forster et al. | |
| 2006/0132312 A1 * | 6/2006 | Tavormina | 340/572.7 |
| 2007/0063843 A1 | 3/2007 | Tsirline et al. | |
| 2007/0099566 A1 | 5/2007 | Borisov et al. | |
| 2007/0216591 A1 | 9/2007 | Tsirline et al. | |

FOREIGN PATENT DOCUMENTS

| | | |
|---|---|---|
| FR | 2 822 594 | 9/2002 |
| WO | WO 01/35320 A1 | 5/2001 |

OTHER PUBLICATIONS

Office Action issued Dec. 3, 2008 in U.S. Appl. No. 11/371,785.
Notice of Allowance issued May 6, 2009 in U.S. Appl. No. 11/371,785.
Ron Schmitt; *Understanding electromagnetic fields and antenna radiation takes (almost) no math*; EDN; Mar. 2, 2000; pp. 77-88; available at <http://www.ednmag.com>.
David M. Pozar; *Paragraph 2.5—The Quarter-Wave Transformer*; Microwave Engineering; 2005; pp. 73-76; Third Edition; John Wiley & Sons, Inc.
Constantine A. Balanis; *Chapter 2—Fundamental Parameters of Antennas: Paragraph 2.2.4—Field Regions*; Antenna Theory: Analysis and Design; 2005; pp. 34-36; Third Edition; John Wiley & Sons, Inc.
Xianming Qing and Ning Yang; *2.45 GHZ Circularly Polarized RFID Reader Antenna*; IEEE; 2004; pp. 612-615 (XP10743394).
Written Opinion of the International Searching Authority for corresponding International Appl. No. PCT/US2007/063680.
International Search Report for corresponding International Appl. No. PCT/US2007/063680.

* cited by examiner

RFID UHF STRIPLINE ANTENNA-COUPLER

CROSS-REFERENCE TO RELATED APPLICATIONS

The present application is a continuation-in-part application of application Ser. No. 11/371,785 filed on 9 Mar. 2006 now U.S. Pat. No. 7,586,410.

BACKGROUND OF THE INVENTION

1. Field of the Invention

The present invention relates to RFID antenna-couplers and, in particularly, to spatially selective antenna-couplers capable of selectively communicating with a targeted transponder from among a group of adjacent transponders.

2. Description of Related Art

Radio frequency identification (RFID) transponders, either active or passive, are typically used with an RFID transceiver or similar device for communicating information back and forth. In order to communicate, the transceiver exposes the transponder to a radio frequency (RF) electromagnetic field or signal. In the case of a passive transponder, the RF electromagnetic field energizes the transponder and thereby prompts the transponder to respond to the transceiver by re-radiating the received signal back and modulating the field in a well-known technique called backscattering. In the case of an active transponder, the transponder may respond to the electromagnetic field by transmitting an independently powered reply signal to the transceiver.

Problems can occur when interrogating multiple adjacent transponders regardless on whether the transponders are passively or actively powered. For example, an interrogating electromagnetic signal may activate more than one transponder at a given time. This simultaneous activation of multiple transponders may lead to collision or communication, i.e. read and write, errors because each of the multiple transponders may transmit reply signals to the transceiver at the same time.

Several collision management techniques commercially exist for allowing near simultaneous communication between multiple transponders and a single transceiver while reducing communication errors. However, such collision management techniques tend to increase system complexity, cost, and delay response. Furthermore, such techniques are often "blind" in that they cannot locate a given transponder or more specifically recognize the position of a transponder within the interrogating RF electromagnetic field. For example, in a printer-encoder device, the device would not know whether the transceiver was communicating with a transponder proximate to the printhead or not.

Another method of preventing multiple transponder activation is to electrically isolate transponders from one another. For example, devices or systems may employ an RF-shielded housing or anechoic chamber for shielding the adjacent and non-targeted transponders from the electromagnetic field. In various applications, transponders individually pass though a shielded housing for individualized exposure to an interrogating RF electromagnetic field. Unfortunately, RF-shielded housings add cost and complexity to a system and limit the type (i.e., size) of transponders that can be processed by the system. Furthermore, many systems are limited with regard to space or weight and, thus, cannot accommodate such shielded housings.

The challenge of avoiding multiple transponder activation may be especially acute in some applications. RFID printer-encoders are one example. RFID printer-encoders are devices capable of encoding and printing on a series or stream of labels with embedded transponders. The close proximity of the transponders to each other, during processing, makes targeting a particular transponder for encoding purposes problematic. Moreover, the space, cost, and weight restrictions associated with such devices, among other factors, make collision management techniques or shielding components for alleviating multiple transponder activation less than desirable.

In light of the foregoing it would be desirable to provide a RFID system or device capable of interrogating individual transponders positioned among multiple adjacent transponders without the need for collision management techniques or shielding components.

BRIEF SUMMARY

The present invention may address some of the above needs by providing a stripline antenna-coupler for a RFID system configured to selectively communicate with a targeted transponder from among a group of multiple adjacent transponders. The antenna-coupler is adapted to have a controlled transmission range that can be limited to minimize the inadvertent activation of transponders outside a transponder encoding region. As such, the antenna-coupler operates with little to no anti-collision management techniques or shielding components. The antenna-coupler of the present invention is relatively compact with a length usually one-half wavelength or less minimizing the footprint of the antenna-coupler within the space-restricted RFID system. Also, the antenna-coupler may have an enclosure configured to encourage a particular direction or profile of the transmission signals of the antenna-coupler. For example, the antenna-coupler may be configured for side coupling, i.e. the antenna-coupler may be perpendicular to the targeted transponder, which may be beneficial in a variety of space-restricted systems.

According to one embodiment of the present invention, the RFID system may include a transponder conveyance and a antenna-coupler. The transponder conveyance is adapted to transport the targeted transponder through the transponder encoding region along a predetermined path. The antenna-coupler may be a near field antenna-coupler and be configured to couple with the targeted transponder in the transponder encoding region. And the antenna-coupler may be perpendicular to the targeted transponder during coupling. The system may further include a transceiver that is in electrical communication with the antenna-coupler. The transceiver is configured to generate communication signals.

The antenna-coupler may include a first ground plane and a second ground plane spaced apart from each other and connected by one or more connections and at least two conductive strips positioned between the ground planes. The conductive strips are configured to propagate a plurality of electromagnetic fields, while the ground planes and connections between them are configured to promote the propagation of the electromagnetic fields from a side of the conductive strips. More specifically, the electromagnetic fields from the side of the conductive strips may be in a direction generally perpendicular to the length of the conductive strips and generally parallel to the grounds planes for coupling with the targeted transponder in the transponder encoding region. For example, the near field antenna-coupler may include a number of connections that extend substantially around the conductive strips and define one active side of the antenna-coupler free of connections and is configured to promote the propagation of the electromagnetic fields from the active side for coupling with the targeted transponder.

The antenna-coupler may also have a dielectric material positioned between the first ground plane and the second ground plane. For example, the dielectric material may be FR4 or air.

The antenna-coupler may also include an input port for connecting the antenna-coupler to the transceiver and at least one terminating load. Each of the conductive strips may extend from a first end that is connected to the input port and a second end that is connected to the at least one terminating load. Each second end of each conductive strip may be terminated by an individual terminating load (i.e., one load per strip) such that the load impedance ("$Z_L$") equals the input impedance ("$Z_{IN}$") multiplied by the number of conductive strips of the antenna-coupler ("N"). Alternatively, the second ends of the conductive strips may be terminated by a common terminating load (i.e., the conductive strips are terminated by the same load) such that $Z_L$ equals $Z_{IN}$.

The antenna-coupler of the present invention may further be configured to operate within a band of frequencies. Each conductive strip defines a width and a length. According to one embodiment of the present invention, the width of a conductive strip remains substantially constant and the length of the conductive strip is substantially equal to one half wavelength of the centered frequency within the band of frequencies. According to another embodiment, the width of the conductive strip varies forming a tapered profile and the length of the conductive strip is equal to or less than one half wavelength of the centered frequency. For example, the tapered profile of a conductive strip may be a modified bowtie profile, an exponential profile, a triangular profile, a Klopfenstein profile, and a Hecken profile.

The dielectric material may form a number of dielectric substrates depending on the number of conductive strips. A conductive strip may be directly deposited onto one of the surfaces of the dielectric substrates. Or the dielectric material may form one overall substrate layer having cut-outs for receiving the conductive strips.

According to one embodiment of the present invention, the input port is adjacent to one of the ground planes and is connected to the first end of each of the conductive strips by a connection extending through the ground plane, the dielectric material, and to the conductive strips.

The antenna-coupler may have a first and a second terminating load. The first terminating load may be adjacent to the first ground plane and may be connected to the second end of the first conductive strip by a connection extending through the first ground plane, the dielectric material, and to the first conductive strip. The second terminating load may be adjacent to the second ground plane and is connected to the second end of the second conductive strip by a connection extending through the second ground plane, the dielectric material, and to the second conductive strip. Alternatively, each of the terminating loads may be on the same ground plane. Each connection may be a via, such as a hidden or buried via.

Each of the conductive strip defines a characteristic impedance which may be less than the load impedance. For example, the load impedance may be substantially equal to 50 ohms and the characteristic impedance may be less than 50 ohms.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2b a cross-section view of the web and antenna-coupler of FIG. 2a;

FIG. 6b is a perspective exploded view of the antenna-coupler of FIG. 6a.

DETAILED DESCRIPTION OF THE INVENTION

The present invention now will be described more fully hereinafter with reference to the accompanying drawings, in which some, but not all embodiments of the invention is shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention concerns an apparatus for enabling an RFID transceiver (sometimes referred to as a "reader") to selectively communicate with a targeted transponder that is commingled among or positioned in proximity to multiple adjacent transponders. As will be apparent to one of ordinary skill in the art, various embodiments of the present invention are described below that selectively communicate with a targeted transponder requiring little to no physical isolation of the transponder using space-consuming shielded housings, anechoic chambers, or relatively more complex or costly collision management techniques.

Several embodiments of the present invention may be useful for reading, writing, or otherwise encoding passive or active transponders located on assembly lines, in inventory management centers where on-demand RFID labeling may be needed, or in other similar circumstances, where the transponders are in close proximity to each other. In various embodiments, one or more transponders are mounted to or embedded within a label, ticket, card, or other media form that may be carried on a liner or carrier. In alternate linerless embodiments, a liner or carrier may not be needed. Such RFID enabled labels, tickets, tags, and other media forms are referred to collectively herein as "media units." As will be apparent to one of ordinary skill in the art, it may be desirable to print indicia such as text, numbers, barcodes, graphics, etc., to such media units before, after, or during communications with their corresponding transponders.

The present invention has been depicted, for illustration purposes, in the context of a specific application, namely, RFID enabled printer systems, also referred to herein as "printer-encoders." Examples of printer-encoders are disclosed in commonly-owned U.S. Pat. Nos. 6,481,907 and 6,848,616, which are hereby incorporated herein by reference. However, the inventive concepts described herein are not limited to printer-encoders and may be applied to other RFID enabled systems that may benefit from the ability to selectively communicate with a targeted transponder disposed among multiple adjacent transponders close to the antenna-coupler.

Figure 1:
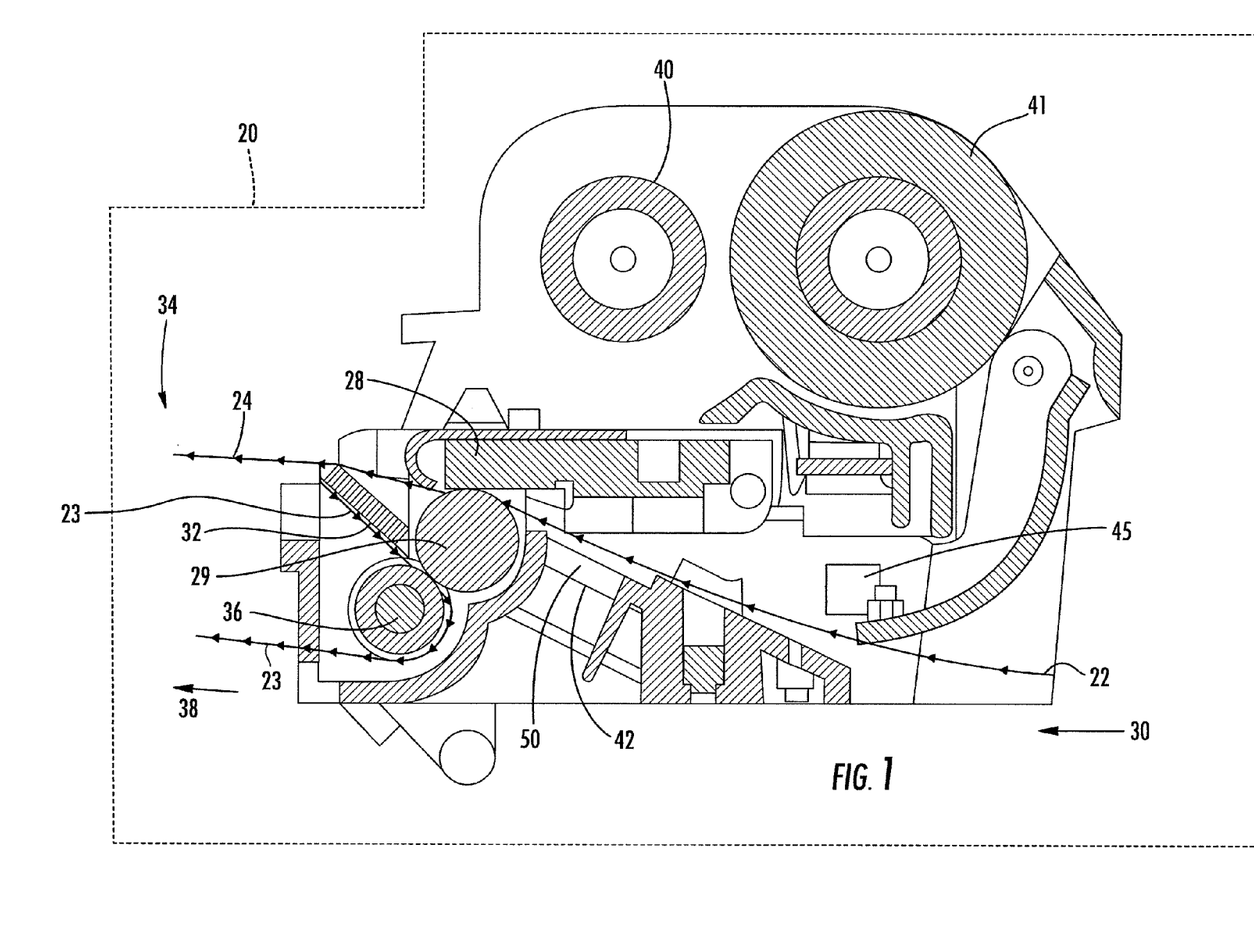
FIG. 1 is a side schematic view of a printer-encoder according to an embodiment of the present invention.
Figure 2A:
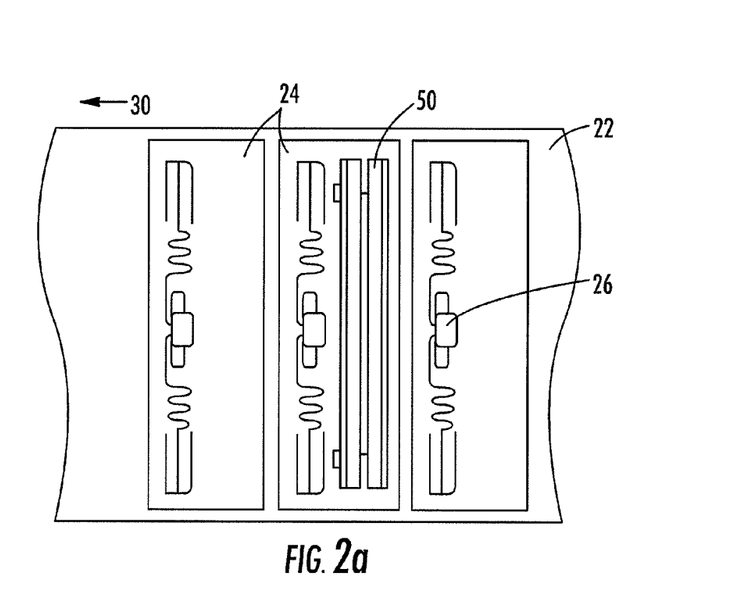
FIG. 2a is a simplified cut-away top view of a web of media units passing over a antenna-coupler according to an embodiment of the present invention.
Figure 2B:
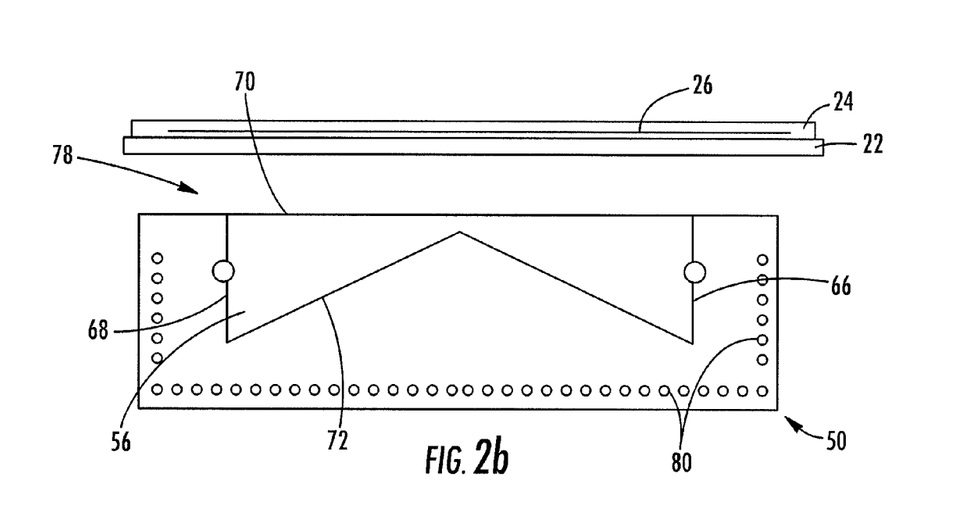

FIG. 1 illustrates an RFID printer-encoder 20 structured for printing and programming a series or stream of media units 24 according to one embodiment of the present invention. In various embodiments, as shown in FIGS. 2a and 2b, at least a few of the media units 24 include transponders 26. As noted above, media units may include labels, cards, etc, that are carried by a substrate liner or web 22 as shown.

Referring back to FIG. 1, the printer-encoder 20 includes several components, such as a printhead 28, a platen roller 29, a feed path 30, a peeler bar 32, a media exit path 34, rollers 36, a carrier exit path 38, a take-up spool 40, a ribbon supply roll 41, a transceiver 42, a controller 45, and a antenna-coupler 50. The web 22 is directed along the feed path 30 and between the printhead 28 and the platen roller 29 for printing indicia onto the media units 24. The ribbon supply roll 41 provides a thermal ribbon (not shown for clarity) that extends along a path such that a portion of the ribbon is positioned between the printhead 28 and the media units 24. The printhead 28 heats up and presses a portion of the ribbon onto the media units 24 to print indicia. The take-up spool 40 is configured to receive and spool the used ribbon. This printing technique is commonly referred to as a thermal transfer printing. However, several other printing techniques may be used including, but not limited to, direct thermal printing, inkjet printing, dot matrix printing, and electro-photographic printing.

After printing, as shown in FIG. 1, the media unit web 22 proceeds to the media exit path 34 where the media units are typically individually removed from the web 22. For example, in one embodiment, pre-cut media units 24 may be simply peeled from the web 22 using the peeler bar 32 as shown. In other embodiments, a group of multiple media units may be peeled together and transmitted downstream to an in-line cutter for subsequent separation (not shown). Various other known media unit removal techniques may be used as will be apparent to one of ordinary skill in the art.

In applications, such as the depicted embodiment, in which the media units 24 are supported by a web 22, the web 22 may be guided out of the printer-encoder 20 along the carrier exit path 38 by rollers 36 or other devices. Techniques and structures for conveying or guiding the web of media units along the entire feed path of the printer-encoder are well known in the art and, thus, such techniques and conveyance systems are not described in great detail.

The transceiver 42 is configured for generating and transmitting RF communication signals that are broadcasted by the spatially selective antenna-coupler 50 located proximate the media feed path 30. For purposes of the present specification, the transceiver 42 and the antenna-coupler 50 may be referred to collectively as forming at least part of a communication system. As will be explained in more detail below, the communication system transmits an electromagnetic signal or pattern for establishing, at predetermined transceiver power levels, a mutual coupling between the transceiver and a targeted transponder of a media unit that is located in the transponder encoding region, such that data may be read from and written to transponder. The electromagnetic signal has a far field component and a near field component. In general, the far field component is too weak to activate or communicate with any of the transponders, while the near field component is concentrated mostly in the transponder encoding region such that it only activates or communicates with the transponders in the transponder encoding region.

In general, the transceiver is a device configured to generate, process, and receive electrical communication signals. One in the art would appreciate that similar devices such as transmitters, receivers, or transmitter-receivers may be used within this invention. "Transceiver" as used in the present application and the appended claims refers to the devices noted above and to any device capable of generating, processing, or receiving electrical and/or electromagnetic signals.

Figure 3:
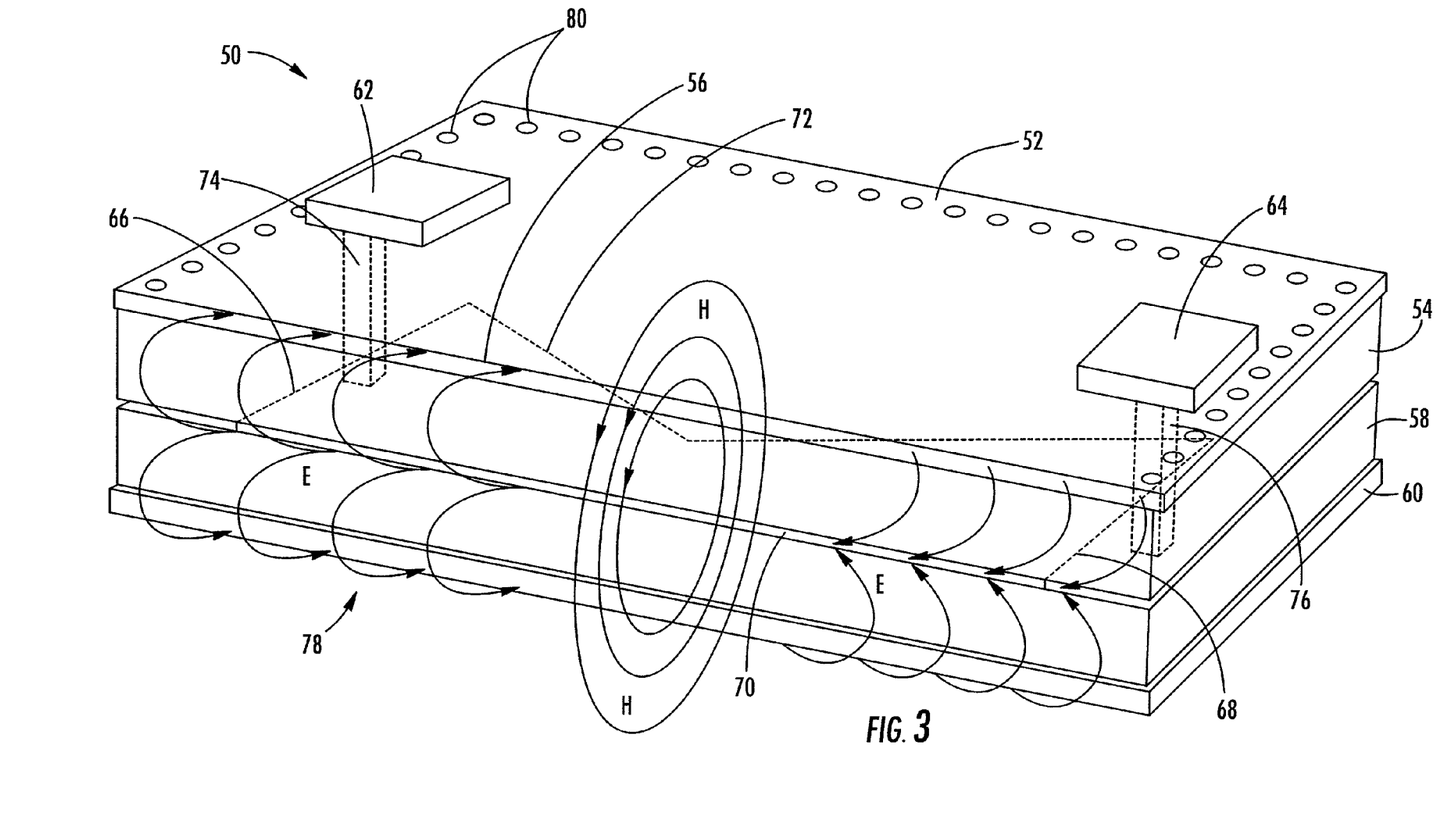
FIG. 3 is a perspective view of an electromagnetic field distribution of the antenna-coupler of FIG. 2b.

FIG. 3 illustrates the stripline antenna-coupler 50 in accordance with an embodiment of the present invention. The antenna-coupler 50 is structured in electrical communication with the transceiver (not shown in FIG. 3) for receiving and broadcasting the signals originating from the transceiver to the targeted transponder. In the depicted embodiment, the stripline antenna-coupler 50 includes a first ground plane 52, a first dielectric substrate 54, a conductive strip 56, a second dielectric substrate 58, a second ground plane 60, an input port 62 and a terminating load 64.

The ground planes 52, 60, the dielectric substrates 54, 58, and the conductive strip 56 are stacked such that the conductive strip 56 is between the dielectric substrates 54, 58 and the ground planes 52, 60. More specifically, according to the illustrated embodiment of FIG. 3, the first ground plane 52 has a first surface and an opposite second surface. The first dielectric substrate 54 has a first surface and an opposite second surface. The first surface of the first dielectric substrate 54 is adjacent to the second surface of the first ground plane 52. The conductive strip 56 also has a first surface and an opposite second surface. The first surface of the conductive strip 56 is adjacent to the second surface of the first dielectric substrate 54. The second dielectric substrate 58 has a first surface and an opposite second surface. The first surface of the second dielectric substrate 58 faces the second surface of the first dielectric substrate 54 and is adjacent to the second surface of the conductive strip 56. The second ground plane 60 has a first surface and an opposite second surface. The first surface of the second ground plane 60 is adjacent to the second surface of the second dielectric substrate 58.

Although the first and second dielectric substrates 54, 58 are primarily described as separate layers within the antenna-coupler 50, the first and second dielectric substrates may be one overall substrate or dielectric layer that is between the two ground planes 52, 60 and includes a cut-out area configured to receive the conductive strip 56. Also, the ground planes and dielectric substrates are depicted as being generally rectangular in shape. However, the general shape of the ground planes and the dielectric substrates may vary between applications. For example, the ground planes and the dielectric substrates may be a portion of a relatively larger printed circuit board. The dielectric substrates may be made or constructed from various dielectric materials, including but not limited to, plastics, glasses, ceramics, or combinations such as Rogers materials, Isola materials, or woven glass reinforced epoxy laminate, commonly referred to as "FR4" or flame resistant 4. Moreover, the dielectric material may be air. Therefore the two ground planes may be spaced apart from each other and have only air and the conductive strip between them. One in the art would appreciate that these various materials may be used to achieve a specific dielectric constant.

Figure 6A:
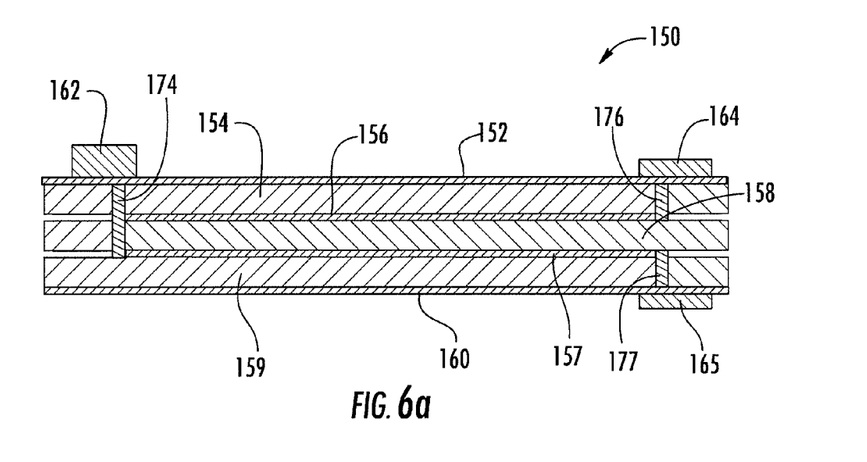
FIG. 6a is a cross-sectional side view of a antenna-coupler according to another embodiment of the present invention.
Figure 6B:
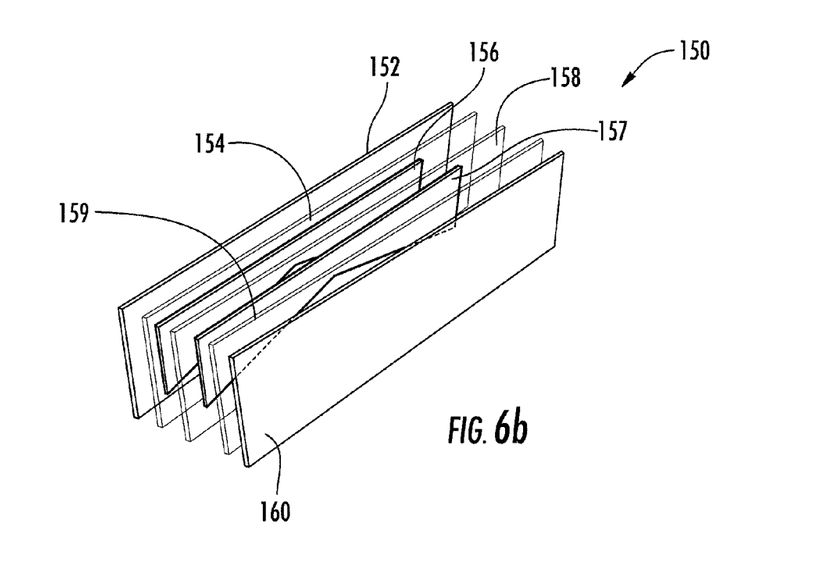

FIGS. 6a and 6b illustrate the stripline antenna-coupler 150 in accordance with another embodiment of the present invention. Rather than having one conductive strip, the stripline antenna-coupler 150 may have multiple conductive strips. For example, according to the embodiment of FIG. 6, the stripline antenna-coupler 150 has two conductive strips 156, 157. In this depicted embodiment, the stripline antenna-coupler 150 includes a first ground plane 152, a first dielectric substrate 154, a first conductive strip 156, a second dielectric substrate 158, a second ground plane 160, a second conductive strip 157, a third dielectric substrate 159, an input port 162 and first and second terminating loads 164, 165.

The ground planes 152, 160, the dielectric substrates 154, 158, 159 and the conductive strips 156, 157 are stacked such that the conductive strips 156, 157 are between the dielectric substrates 154, 158, 159 and the ground planes 152, 160. More specifically according to the illustrated embodiment of FIGS. 6a and 6b, the first ground plane 152 has a first surface and an opposite second surface. The first dielectric substrate 154 has a first surface and an opposite second surface. The first surface of the first dielectric substrate 154 is adjacent to the second surface of the first ground plane 152. The first conductive strip 156 also has a first surface and an opposite second surface. The first surface of the first conductive strip 156 is adjacent to the second surface of the first dielectric substrate 154. The second dielectric substrate 158 has a first surface and an opposite second surface. The first surface of the second dielectric substrate 158 faces the second surface of the first dielectric substrate 154 and is adjacent to the second surface of the first conductive strip 156. The second conductive strip 157 has a first surface and an opposite second surface. The first surface of the second conductive strip 157 faces the second surface of the second dielectric substrate 158 and is adjacent to the second surface of the second dielectric substrate 158. The third dielectric substrate 159 has a first surface and an opposite second surface. The first surface of the third dielectric substrate 159 faces the second surface of the second conductive strip 157 and is adjacent to the second surface of the second conductive strip 158. The second ground plane 160 has a first surface and an opposite second surface. The first surface of the second ground plane 160 is adjacent to the second surface of the third dielectric substrate 159.

Although the first, second, and third dielectric substrates 154, 158, 159 are primarily described as separate layers within the antenna-coupler 150, the first, second, and third dielectric substrates may be one overall substrate or dielectric layer that is between the two ground planes 152, 160 and includes cut-out areas configured to receive the conductive strips 156, 157. Also, the ground planes and dielectric substrates are depicted as being generally rectangular in shape. However, the general shape of the ground planes and the dielectric substrates may vary between applications. For example, the ground planes and the dielectric substrates may be a portion of a relatively larger printed circuit board. The dielectric substrates may be made or constructed from various dielectric materials, including but not limited to, plastics, glasses, ceramics, or combinations such as Rogers materials, Isola materials, or woven glass reinforced epoxy laminate, commonly referred to as "FR4" or flame resistant 4. Moreover, the dielectric material may be air. Therefore the two ground planes may be spaced apart from each other and have only air and the conductive strip between them. One in the art would appreciate that these various materials may be used to achieve a specific dielectric constant.

As an example only, the stripline antenna-coupler 50 having a single conductive strip as in FIG. 3 may have approximately the following overall dimensions 3.5×18×100 mm and the stripline antenna-coupler 150 having two conductive strips as in FIG. 6 may have approximately the following overall dimensions 6×14×100 mm. The bow-tie shaped conductive strip may have a width that varies linearly from 9 mm to 4.5 mm back to 9 mm. For the double conductive strips, each conductive strip may have a width that varies linearly from 10 mm to 3 mm back to 10 mm. The linear length of the conductive strip (from end to end) may be approximately 64 mm in an embodiment having a single conductive strip. The linear length of the conductive strip (from end to end) may be approximately 57 mm in an embodiment having two conductive strips.

As explained in more detail below, the conductive strip 56 (or strips 156, 157) provides a conductive plane for the propagation of electromagnetic waves from the antenna-coupler to a targeted transponder. The conductive strip is fabricated from a conductive material. For example only, the conductive material may be copper, gold, silver, aluminum or combination thereof, or doped silicon or germanium. The conductive strip 56 has a length extending from a first end, referred to herein as the input end 66, to a second end, referred to herein as the loaded end 68. The conductive strip 56 defines a width from a first side edge 70 to a second side edge 72. The conductive strip 56 also has a thickness extending from the first surface of the conductive strip to the second surface of the conductive strip.

The method of fabricating the antenna-coupler, including the conductive strip may vary. For example and as noted above, the dielectric substrate may include a cut out area in which the conductive strip is inserted into. The conductive strip may also be deposited directly onto either the second surface of the first dielectric substrate or the first surface of the second dielectric substrate. For example only, the conductive strip may be printed or etched onto one of these surfaces.

The input end 66 of each conductive strip is connected to the input port 62. For example only and as shown in FIG. 3, the input port 62 may be adjacent to the first surface of the first ground plane 52 and may be connected to the input end 66 of the conductive strip by a vias or other connection 74 extending through the first ground plane 52 and the first dielectric substrate 54 to the conductive strip 56. For the embodiment of FIG. 6a, the input port 162 may be connected to both the input ends of the first and second conductive strips 156, 157 by a via or other connection 174 extending through the first ground plane 152 and extending through the dielectric substrates 154, 158 to the conductive strips 156, 157.

Referring back to FIG. 3, the loaded end 68 of the conductive strip is connected to the terminating load 64. The terminating load 64 may be adjacent to the first surface of the first ground plane 52 and may be connected to the loaded end 68 of the conductive strip by a via or other connection 76 extending through the first ground plane 52 and the first dielectric substrate 54 to the conductive strip 56. As another example, in the embodiment illustrated in FIG. 6a, each of the loaded ends 168, 169 of the first and second conductive strips 156, 157 may be connected to a terminating load 164, 165 by one or more vias or other connections 176, 177. Although depicted as two separate terminating loads 164, 165, in other embodiments each loaded end 168, 169 may be connected to the same terminating load.

The input port 62 connects the transceiver directly (or indirectly through any form of transmission line) to the antenna-coupler. For example, the input port may be a "RF port" as known in the art. In particular, the transceiver is configured to send an electrical source signal to the antenna-coupler through the input port. The signal passes through the input port 62, the conductive strip 56, and into the terminating load 64, which is connected to at least one of the ground planes 52, 60.

In general as the electrical signal passes through a conductive strip, the conductive strip operates as a transmission line, rather than operating as a standing wave radiating antenna or magnetic field generating coil. The passing signal in the conductive strip generates electromagnetic fields concentrated in the near field region of the conductive strip. The electromagnetic fields may be adapted to couple the antenna-coupler to a transponder disposed proximate the conductive strip, referred to herein as the transponder encoding region. A more detailed description of the electromagnetic fields concentrated in the near field region, also known as "leaky" electromagnetic fields, is provided in "Leaky Fields on Microstrip" L. O. McMillian et al. Progress in Electromagnetics Research, PIER 17, 323-337, 1997 and in commonly owned U.S. Patent Application Publication Nos. 2005/0045723 and 2005/0045724 to Tsirline et al., which are hereby incorporated by reference. The effective range of antenna-couplers relying on such leaky electromagnetic fields is limited because the fields degrade, at an exponential rate, with increasing distance from the antenna-coupler. This limited range reduces the likelihood that a given transceiver's signal will activate transponders outside the transponder encoding region.

As stated above the conductive strip is terminated at one end by the terminating load. The terminating load is configured to have an impedance value substantially equal to a source impedance defined by the transceiver and its related circuitry. For example, the terminating load and the source impedance may be 50 ohms. In general, at the center operating frequency, the input impedance of the antenna-coupler measured at the input end of a conductive strip that has a linear length (i.e., measured from the input end to the loaded end) of one half wavelength, or multiple thereof, is substantially equal to the terminating load regardless of the characteristic impedance of the conductive strip. A linear conductive strip (i.e., a conductive strip have a constant width) may be effectively shortened by tapering the conductive strip, such that the width of the conductive strip varies over the length of the conductive strip. In other words, a tapered conductive strip having a length less than one half wavelength is similar to a conductive strip having a length equal to one half wavelength in that it has minimal impact on the input impedance. The characteristic impedance of the conductive strip is defined by the width of the conductive strip. Because it has no or minimal influence on the input impedance of the antenna-coupler at the center operating frequency, the conductive strip is dimensioned to achieve proper coupling with a targeted transponder, while the terminating load is configured to maintain an impedance match between the antenna-coupler and the transceiver. For example, the width of the conductive strip may be decreased or increased at selective areas to produce a desired operating bandwidth of the antenna-coupler. Decreasing the width of the conductive strip at its center generally increases (i.e. widens) the bandwidth.

Although the relationship between the characteristic impedance of the conductive strip and the terminating load impedance may vary, according to one embodiment the characteristic impedance is less than the terminating load impedance. Terminating the conductive strip with a terminating load allows for impedance matching. Further, terminating the conductive strip with a terminating load that is substantially equal to the source impedance and greater than the characteristic impedance of the conductive strip forms what is known in the art as a "band-pass filter." A band-pass filter is a device that is configured to transmit signals in a particular frequency band or bandwidth. For example, the antenna-coupler may have an operating frequency band of 902 MHz-928 MHz and a center operating frequency of 915 MHz.

FIGS. 2b and 3 illustrate one example of a tapered conductive strip 56 according to an embodiment of the present invention. One side edge 72 of the conductive strip is angled inwardly from the input end 66 to a midpoint in the conductive strip 56 then the side edge 72 is angled outwardly from the midpoint to the loaded end 68. The opposite side edge 70 of the conductive strip remains substantially straight and parallel relative to the length of the conductive strip 56 from the input end 66 to the loaded end 68. The two side edges 70, 72 together define a "modified bow-tie" profile. However the profile of the conductive strip may vary. One in the art would appreciate the various possible tapered profiles including, but not limited to, exponential, triangular, Klopfenstein, and Hecken taper profiles.

In embodiments having more than one conductive strip, a wider operating bandwidth may be achieved by varying the lengths of the individual conductive strips. More specifically, in an embodiment have first and second conductive strips, a length of the first conductive strip may be shorter and a length of the second conductive strip may be longer than the resonating length (e.g., ¼, and ½ wavelengths) of the conductive strips. In an embodiment having a first conductive strip, a second conductive strip, and a third conductive strip, a length of the first conductive strip me be shorter, a length of the second conductive strip (between the first and third conductive strips) may be substantially equal to, and a length of the third conductive strip may be longer than the resonating length of the conductive strips. By varying the lengths, the antenna-coupler has a wider operating bandwidth compared to an embodiment in which the conductive strips have the same length relative to one another.

One aspect of the present invention is the orientation of the antenna-coupler and, more particularly, of the conductive strip to the targeted transponder during coupling. As illustrated in FIG. 3, the dielectric substrates 54, 58 adjacent to the first and second surfaces of the conductive strip 56 along with the ground planes 52, 60 promote the propagation of the electromagnetic fields E, H from the side edges 70, 72 of the conductive strip in a direction generally perpendicular to the length of the conductive strip 56 and generally parallel to the ground planes 52, 60 (referred to herein as side propagation) and thus facilitates the coupling with a transponder that is positioned generally perpendicular to the conductive strip 56 and thus the antenna-coupler (referred to herein as side coupling). As used herein, the transponder and antenna-coupler are considered to be perpendicular when the width of the conductive strip is perpendicular to a length of the transponder.

To further promote side propagation, the two ground planes 52, 60 may be connected along their perimeters, such that the two ground planes 52, 60 are connected along three sides. The fourth and unconnected side is referred to as the active side 78. The ground planes 52, 60 in effect form an envelope or an enclosure for receiving the conductive strip 56, where one side, i.e., the active side 78, of the envelope is opened such that the electromagnetic fields propagate out of the envelope and are directed or aimed at the targeted transponder. For example and as shown in FIGS. 2b and 3, the two ground planes 52, 60 may be connected by a series of vias 80 extending along the three sides. Also, as shown, in the modified bow-tie profile embodiment, the substantially straight side edge 70 of the conductive strip 56 is positioned such that it is facing out and near the active side 78 defined by the ground planes 52, 60. The connected sides of the ground planes 52, 60 will further promote side propagation from the straight side edge 70 of the conductive strip through the active side 78 defined by the ground planes 52, 60. While the described embodiment uses a plurality of vias 80 to connect the first and the second ground planes 52, 60, a plurality of vias is only an example of the type of connections that may be employed with the present invention. Another example includes using additional ground planes or combination of additional ground planes and vias to connect the first and second ground planes along their edges to create the envelope for receiving the conductive strip. Creating an envelope as described herein (e.g., stitching three sides of the antenna-coupler with vias or other connections) is also applicable for multiple conductive strip embodiments, such as the embodiment illustrated in FIG. 6a.

In yet another means of promoting side propagation may be the shape of the conductive strip. For example, the modified bow-tie profile of the illustrated embodiment, concentrates a maximum magnetic field strength H at the straight side edge 70 near the middle point where the width of the conductive strip 56 is the narrowest, as well as fringe electric fields E along the side edge 70.

As illustrated in FIGS. 2a and 2b, the enclosed design of the antenna-coupler 50 also provides a novel architecture for the printer-encoder installation. Also described above, within a printer encoder, a web 22 of media units 24 may be directed along a feed path 30 by a media conveyance system. The feed path includes passing near or through the transponder encoding region where the antenna-coupler is configured to couple with the transponders of the media units. The direction of the feed path near or through the transponder encoding region defines a feed direction. Because the antenna-coupler of the present invention is configured for side coupling, the antenna-coupler 50 may be generally perpendicular to the web 22 of media units 24. As used herein, a antenna-coupler is generally perpendicular to the web of media units when the width of the conductive strip, which also generally defines a width of the antenna-coupler, is generally perpendicular to the feed direction.

This configuration of the antenna-coupler in a generally perpendicular orientation relative to the feed path may provide a desired printer-encoder architecture, structure, or configuration. Specifically, because the width of the antenna-coupler is relatively vertical, the antenna-coupler occupies less horizontal space in the printer-encoder providing more horizontal space or allowing for a more horizontally compact package, which in turn allows for smaller media unit sizes.

Figure 4:
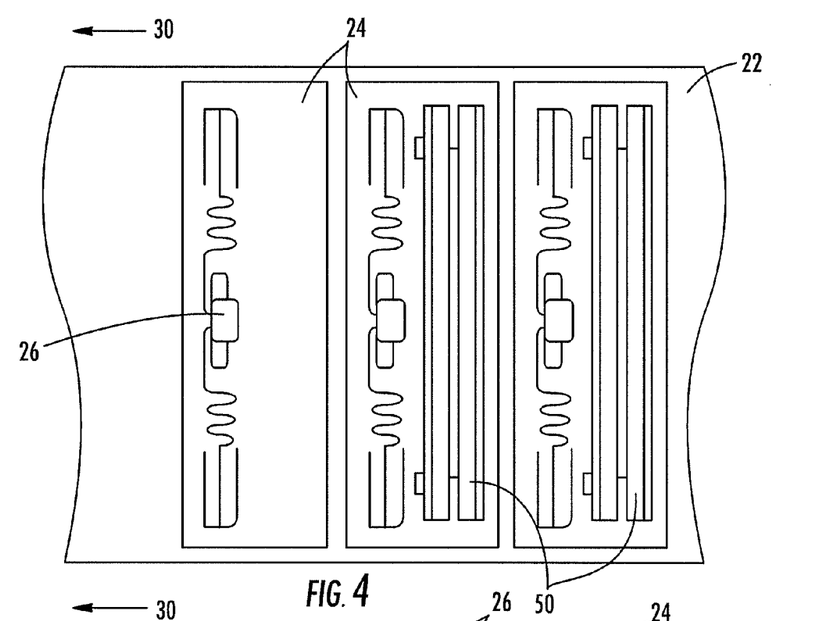
FIG. 4 is a simplified cut-away bottom view of a web of media units passing over a antenna-coupler array according to another embodiment of the present invention.

Although the present invention has been primarily described as a antenna-coupler for an RFID enabled system, the present invention may employ more than one antenna-coupler. For example and as shown in FIG. 4, the present invention may include more than one antenna-coupler 50. The antenna-couplers 50 together define a antenna-coupler array. Individual antenna-couplers within the array may be selectively activated in order to follow a targeted transponder as it moves along a predetermined path within the system or accommodate different size or type of tags.

Figure 5:
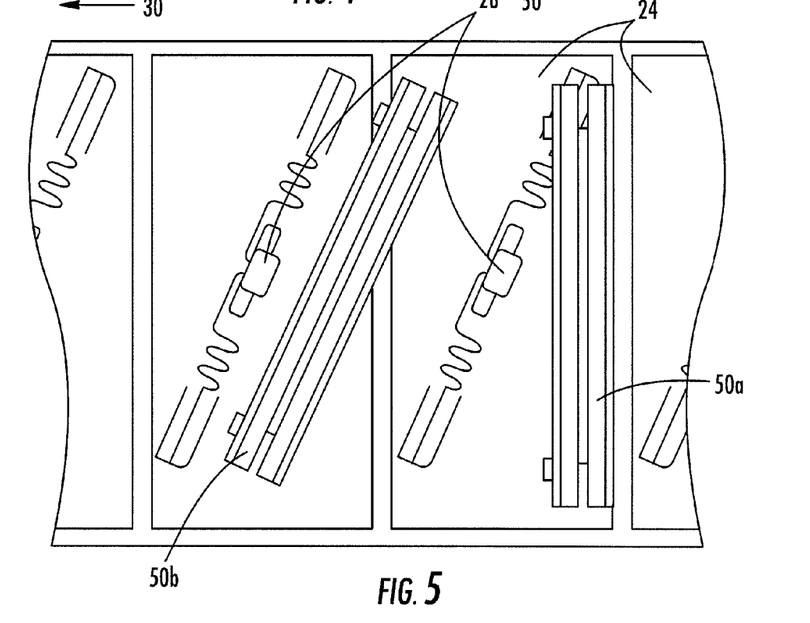
FIG. 5 is a simplified cut-away bottom view of a web of media units passing over a antenna-coupler array according to yet another embodiment of the present invention.

The orientation of the antenna-couplers 50 to the feed path 30 or to each other may vary. As shown in FIG. 4, the antenna-couplers 50 may be substantially parallel to each other and generally perpendicular to the feed path 30. FIG. 5 illustrates another embodiment of a antenna-coupler array having at least one antenna-coupler 50a that is perpendicular to the feed path and at least one other antenna-coupler 50b that is at a 45° angle to the feed path 30. Positioning the antenna-couplers at different angles or orientations to the feed path enables the array to communicate with a greater variety of media units. More specifically, in many applications the transponders 26 are generally parallel to the width of the media units 24, such that the transponders 26 are generally perpendicular to the feed path 30, as shown in FIG. 4. However, in other applications the transponders 26 may be angled across the media unit 24. For example, and as shown in FIG. 5, the transponders 26 may be positioned diagonally across the media unit 24, such that the transponders 26 are generally at a 45° angle to the feed path 30. An array with antenna-couplers at different orientations may adjust to the different orientations of the transponders on the media units, by activating the antenna-couplers that share a similar orientation to the feed path as the transponders. Perpendicular and 45° degree orientations are only two examples of the various orientations that may be used within the present invention. The array may include antenna-couplers with any orientation (e.g., 0° through 90°). It should be understood that the array may include more than two antenna-couplers and more than two antenna-coupler orientations. Also, it should be understood that the type of antenna-couplers within the array may vary. For example, the array may include any type of stripline antenna-coupler or microstrip antenna-coupler.

Further, the present invention has been disclosed primarily in terms of a antenna-coupler configured to broadcast primarily in the near field. However, it must be understood that the enclosure describe herein for directing antenna antenna-coupler signals is not restricted to near field antenna-couplers. It is contemplated that any type of antenna-coupler could be encased in the enclosure to thereby direct the fields of the antenna-coupler to the open end or ends of the enclosure.

FIG. 3 illustrates an embodiment of the enclosure where the three sides of the dielectric substrates and the ground planes are interconnected by vias, such that the fields of the antenna-coupler are directed out of the fourth and active side. It must be understood that this is only an exemplary configuration. Many configurations of the enclosure may be employed to provide the desired field emission profile. Any pattern could be created by varying the portions of the sides or edges that are interconnected. For example, portions of the fourth sides could also be enclosed to further direct the field emissions. In particular, the end portions of the fourth sides of the ground planes could be interconnected to direct field emissions from a center portion of the fourth side of the enclosure. Oppositely, the center portion of the fourth side could be interconnected to direct the fields from the end portions of the fourth sides. Other examples come to mind. For example, open portions could be configured along any of the edges to give desired field emissions.

FIGS. 3 and 6 illustrate sandwich type arrangements where the conductive strip or strips are sandwiched between two ground planes such that the fields are emitted from the sides of the antenna-coupler. The ground planes can be configured in any orientation to allowed field emissions from any side of the antenna-coupler. For example, ground planes could create a tray for the antenna-coupler having a bottom formed by a first ground plane and a side wall extending around the perimeter of the bottom and formed by additional ground planes. A microstrip could be located in the tray such that fields emitting from the microstrip are encourage to propagate through a top surface of the antenna-coupler defined by an open top of the tray.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A stripline antenna-coupler for a RFID enabled system having a transceiver, the antenna-coupler being adapted to couple a transceiver with a targeted transponder in a transponder encoding region from among a group of multiple adjacent transponders, the antenna-coupler comprising:
a first ground plane and a second ground plane spaced apart from each other;
at least one connection between the first ground plane and the second ground plane for connecting the first ground plane to the second ground plane;
a first conductive strip being positioned at least partially between the first and second ground planes and configured to propagate a plurality of electromagnetic fields; and
a second conductive strip being positioned at least partially between the first conductive strip and the second ground plane and configured to propagate a plurality of electromagnetic fields,
wherein the first ground plane, the second ground plane, and the at least one connection promote the propagation of the plurality of electromagnetic fields from a side of each of the first and second conductive strips, the stripline antenna-coupler is configured to propagate the electromagnetic fields from the side of each of the first and second conductive strips in a direction generally parallel to the first and second ground planes for coupling with the targeted transponder in the transponder encoding region.

2. The stripline antenna-coupler according to claim 1 further comprising a dielectric material positioned between the first ground plane and the second ground plane and at least partially around the first and second conductive strips.

3. The stripline antenna-coupler according to claim 2, wherein the dielectric material is from the group consisting of a ceramic, a plastic, and a combination of ceramic and plastic.

4. The stripline antenna-coupler according to claim 2, wherein the dielectric material is air.

5. The stripline antenna-coupler according to claim 1, wherein the propagation of the plurality of electromagnetic fields from the side of each of the first and second conductive strips is in a direction generally perpendicular to a length of the first and second conductive strips.

6. The stripline antenna-coupler according to claim 1, wherein the antenna-coupler is a near field antenna-coupler and the plurality of electromagnetic fields are concentrated in a near field region of the conductive strip.

7. The stripline antenna-coupler according to claim 6 further comprising an input port for connecting the antenna-coupler to the transceiver and at least a first terminating load and a second terminating load, wherein the at least first and second terminating loads divided by a number of conductive strips of the stripline antenna-coupler define an input impedance and wherein the input impedance is substantially equal to a source impedance of the transceiver and wherein each conductive strip extends from a first end connected to the input port and a second end connected to one of the at least first and second terminating loads, wherein the first end and second end of the first conductive strip defines a length for the first conductive strip and the first end and second end of the second conductive strip defines a length for the second conductive strip.

8. The stripline antenna-coupler according to claim 6 further comprising an input port for connecting the antenna-coupler to the transceiver and a terminating load defining an input impedance, wherein the input impedance is substantially equal to a source impedance of the transceiver and wherein each conductive strip extends from a first end connected to the input port and a second end connected to the terminating load, wherein the first end and second end of the first conductive strip defines a length for the first conductive strip and the first end and second end of the second conductive strip defines a length for the second conductive strip.

9. The stripline antenna-coupler according to claim 1, wherein the antenna-coupler is configured to operate within a band of frequencies and each of the first and second conductive strips defines a width that remains substantially constant along a length of the conductive strip and the length of the conductive strip is substantially equal to a half wavelength of a center frequency of the band of frequencies.

10. The stripline antenna-coupler according to claim 1, wherein the antenna-coupler is configured to operate within a band of frequencies and each of the first and second conductive strips defines a width that varies along the length of the conductive strip and defines a tapered profile and the length of the conductive strip is less than a half wavelength of a center frequency of the band of frequencies.

11. The stripline antenna-coupler according to claim 10, wherein the tapered profile is a modified bow-tie profile.

12. The stripline antenna-coupler according to claim 10, wherein the tapered profile is selected from the group consisting of an exponential profile, a triangular profile, a Klopfenstein profile, and a Hecken profile.

13. The stripline antenna-coupler according to claim 1, wherein each of the first and second conductive strips defines a length; wherein the length of the first conductive strip is shorter than a resonant length of the conductive strips and the length of the second conductive strip is longer than the resonant length of the conductive strips.

14. The stripline antenna-coupler according to claim 1 further comprising a third conductive strip.

15. The stripline antenna-coupler according to claim 1 further comprising a plurality of connections between the first ground plane and the second ground plane, wherein the connections extend substantially around each of the first and second conductive strips and define one active side of the antenna-coupler free of connections and configured to promote the propagation of the electromagnetic fields from the active side for coupling with the targeted transponder.

16. An RFID system for selectively communicating with a targeted transponder from among a group of multiple adjacent transponders, the RFID system comprising:
a transponder conveyance system adapted to transport at least one targeted transponder from a group of multiple adjacent transponders through a transponder encoding region along a predetermined path; and
an antenna-coupler including a first conductive strip, a second conductive strip, a first ground plane, and a second ground plane, wherein each of the first and second conductive strips is positioned at least partially between the first and second ground planes and is configured to propagate an electromagnetic field to the transponder encoding region for communicating with the targeted transponder, the antenna-coupler configured to propagate the electromagnetic field in a direction generally parallel to the first and second ground planes for communicating with the targeted transponder in the transponder encoding region.

17. The RFID system according to claim 16 further including a transceiver configured to generate communication signals, wherein the transceiver is in electrical communication with the antenna-coupler.

18. The RFID system according to claim 17, wherein the antenna-coupler further includes a dielectric material positioned between the first ground plane and the second ground plane and at least partially around the first and second conductive strips.

19. The RFID system according to claim 18, wherein the antenna-coupler is a near field antenna-coupler configured to create a plurality of electromagnetic fields concentrated in a near field region of the antenna-coupler.

20. The RFID system according to claim 19, wherein the near field antenna-coupler further includes a first terminating load and a second terminating load, and each of the first and second conductive strips extends from an input end connected to the transceiver to a loaded end connected to the at least one of the first and second terminating loads and between a first side edge and a second side edge, wherein the input end and the loaded end define a length of the conductive strip and the first side edge and the second edge define a width the conductive strip, and the width of the conductive strip is generally perpendicular to the targeted transponder during coupling.

21. The RFID system according to claim 16, wherein the first conductive strip is positioned at least partially between the first ground plane and the second conductive strip.

* * * * *

UNITED STATES PATENT AND TRADEMARK OFFICE
CERTIFICATE OF CORRECTION

| | | |
|---|---|---|
| PATENT NO. | : 8,358,246 B2 | Page 1 of 1 |
| APPLICATION NO. | : 11/829455 | |
| DATED | : January 22, 2013 | |
| INVENTOR(S) | : Tsirline et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1402 days.

Signed and Sealed this
Twenty-fourth Day of September, 2013

Teresa Stanek Rea
*Deputy Director of the United States Patent and Trademark Office*